Patented Mar. 8, 1927.

1,620,152

UNITED STATES PATENT OFFICE.

LEO P. CURTIN, OF FREEHOLD, NEW JERSEY, ASSIGNOR TO THE WESTERN UNION TELEGRAPH COMPANY, OF NEW YORK, N. Y., A CORPORATION OF NEW YORK.

METHOD OF PRESERVING WOOD AND SOLUTIONS THEREFOR.

No Drawing. Application filed June 24, 1925. Serial No. 39,391.

This invention relates to methods of preserving wood or other cellulosic or vegetable materials which are subject to decay or to the ravages of insects, fungi, etc.; and to solutions applicable for use in connection with such methods. The invention is applicable wherever protection against vegetable or animal attack is desired, as for example for the treatment of telegraph poles; railway ties; structural timber of every description; farm buildings where rat-proofing is a consideration; submarine timbers, piling, etc. to be protected from *Teredo navalis* and *limnoria;* building materials, furniture etc. in countries infested by termites; and all analogous circumstances, including the protection of foliage against insect or fungous attack.

Broadly considered, my invention contemplates the provision of an aqueous solution of a metallic salt or salts, which solution is substantially stable, or sufficiently stable to permit its use for impregnating or spraying purposes, so long as it shielded from atmospheric influences, but upon sufficient exposure to the atmosphere deposits a highly toxic and nearly insoluble metallic compound, usually a salt of copper. The deposition of this toxic compound, when the solution is employed for wood impregnation, takes place within the body of the wood or other material to be protected, and may be brought about in a variety of ways, as for example by oxidization of a component of the solution through exposure to air; or by the loss by evaporation of a volatile component of the mixture or a volatile product of reaction, the change being characterized in either case by a progressive increase in the basicity of the mixture. Certain examples in accordance with the invention will now be given, but it is to be clearly understood that these are illustrative only, and that the specific conditions may be widely varied without departing from the spirit of my invention.

My preferred preservative reagent is cupric arsenite, $CuHAsO_3$, a highly toxic compound of low solubility. By reason of its substantial insolubility in water it is manifestly impossible to employ it as such for impregnating purposes; but I have found that it can be produced and deposited in situ within the body of the wood by impregnating the latter with a solution containing a cuprous compound and arsenious acid, which solution by oxidization upon subsequent exposure to the atmosphere yields the desired cupric arsenite. A typical solution may be prepared by dissolving in water:

|   | Pounds. |
|---|---|
| Copper sulfate ($CuSO_4 5H_2O$) | 1000 |
| Sodium bisulfite ($NaHSO_3$) | 240 |
| Soda ash ($Na_2CO_3$) | 305 |
| Sodium chlorid (NaCl) | 1500 |
| White arsenic ($As_2O_3$) | 200 |
| Sodium fluorid (NaF) | 170 |

The above may readily be dissolved, particularly on heating, in 4000 gallons of water, yielding a clear solution of yellowish color. The proportion of water may be increased or diminished to meet the needs of particular cases. While the solution may be prepared by merely throwing together all of the ingredients, a preferred procedure is first to combine the arsenious oxid with part of the alkali in solution; likewise, the bisulfite may be combined with a portion of the alkali in a separate solution, before addition to the copper salts.

In so complex a mixture as the foregoing it is not practicable to state definitely all of the chemical reactions which may occur, or to name all of the intermediate or final products which may be formed. The following will however, without thereby limiting the invention, afford an idea of the general course of the reactions so far as these are at present understood:

The sodium sulphate brings about the reduction of the cupric salt to the cuprous state, and this cuprous salt is held in solution by the sodium chlorid. The sodium hydrogen sulfate resulting from this reaction is neutralized by the soda ash. A certain excess of sodium sulfite, say about 15%, is provided to guard against premature oxidation of the cuprous salt. When this oxidation ultimately occurs, within the body of the wood, the copper is transformed partly into the desired arsenite, and partly into cupric chlorid.

The principal reactions which are believed to occur may be indicated as follows:

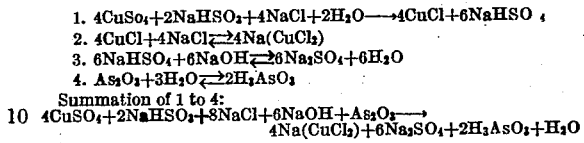

Summation of 1 to 4:
4CuSO₄+2NaHSO₃+8NaCl+6NaOH+As₂O₃ —→
4Na(CuCl₂)+6Na₂SO₄+2H₃AsO₃+H₂O At this point the product is a faintly yellow liquid which is used to impregnate wood. The following reactions are typical of those which are believed to take place inside the wood, in the presence of atmospheric oxygen, after the wood has been removed from the treating solution.

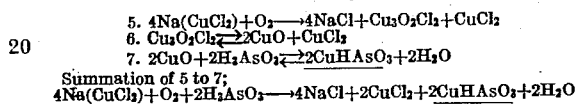

Summation of 5 to 7:
4Na(CuCl₂)+O₂+2H₃AsO₃—→4NaCl+2CuCl₂+2CuHAsO₃+2H₂O

The above reactions are illustrative only, and represent a simple, but typical case involving the precipitation within the wood, through the action of atmospheric oxygen, of arsenite of copper. It will be observed that in this case a portion of the copper appears also a cupric chlorid. In case it is desired to precipitate a part of this in the form of toxic salts of lower solubility, this is readily accomplished by appropriate additions to the bath, as for example sodium fluoride as already mentioned.

It will be understood by those skilled in this art that other mixtures of salts may be chosen, which will by oxidation deposit a toxic body of sufficiently low solubility to avoid material loss upon subsequent exposure to the elements, and such are comprised within this invention.

For example in place of sodium bisulfite I may use other reducing agents, such as sulfurous acid, salts of hydrocyanic acid, salts of thiosulfuric acid, arsenites, and many others. In place of cupric sulfate, other cupric salts, as the acetate may be used. Or if desired cuprous chlorid in chlorid solution may be employed, in which case the use of a reducing agent, other than as it may be desirable to prevent premature precipitation, will of course be unnecessary. Instead of soda ash I may use the alkali hydroxids, borax, sodium bicarbonate or the like. If provision is made for the removal of calcium sulfate, lime or limestone may be used as the alkaline reagent. Calcium chlorid or other soluble chlorids may replace sodium chlorid; and salts of acetic or other weak acid may replace the sodium fluorid. These and other changes may be made without departure from my invention.

The ties, fence posts, telegraph poles or wood in other forms are impregnated with the solution, using any of the well-understood impregnating methods. Upon removal from the liquid the wood is drained and may be shipped at once if desired; or it may be dried by exposure to air, or kiln-dried, before shipment. In the course of a few hours, atmospheric oxygen will have had access to the interior of the wood and acted upon the reagents therein, with precipitation of copper arsenite, fluorid, or in some cases basic chlorids or other basic salts of copper. Such wood is ready for use and is thoroughly preserved.

As already mentioned, other effects than those arising through oxidation may be availed of to bring about the precipitation of a toxic body of slight solubility. Among these I may mention the slow evaporation of a volatile component or reaction product accompanied by an increase in bascity. As an illustrative example of this I will mention the following:

The solution as it is used for impregnating purposes comprises a cupric salt, as the sulfate or chloride, arsenious acid, and a salt of a volatile organic acid, as sodium acetate or formate. The equilibrium first established in the aqueous solution involves the setting free of a small proportion of the organic acid as follows:

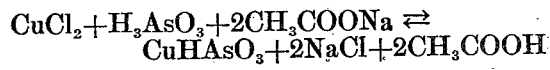

Following the impregnation of the wood and the draining of the excess liquid, the volatile organic acid is slowly dispelled into the atmosphere, or in the case of formic acid is partially oxidized to carbonic acid, with the result that the equilibrium as indicated above is progressively displaced toward the right, with progressive increase of basicity and with the eventual precipitation of most or even all of the copper in the form of arsenite or aceto-arsenite. Other components not incompatible with the desired result may of course be present.

Or, alternatively, the solution may be prepared by dissolving cupric acetate and arsenious acid in proportions as above indicated in the cold, the concentration of the solution being preferably of the order of 1 to 5% with respect to the copper salt. Any precipitate which is initially formed may be re-dissolved by the addition of a small proportion of acetic or equivalent volatile acid, and the resulting clear solution is ready for use. This solution, like that described above, loses acetic acid upon exposure to the air, with precipitation of cupric arsenite or aceto-arsenite.

When arsenic is used I prefer to employ it in the arsenious form, as indicated in the above examples. Arsenic acid may be used but is less desirable, being somewhat less toxic, usually more expensive, and having the disadvantage in formulæ including sulfites or bisulfites of reacting with these salts, leaving the solution without the necessary protection against premature oxidation.

The present invention is to be distinguished from the employment of water soluble salts or compounds, as zinc chloride or the like, which are deposited as such or at least without profound modification of composition, by slow evaporation of the water; and which can in large part be extracted by subsequent leaching. The present invention provides an impregnating solution which is sufficiently stable to avoid premature deposition, but which undergoes a chemical reaction characterized by a progressive increase in basicity under the influence of the atmosphere or on exposure thereto, yielding a toxic substance of such low solubility that it is immune against material loss through subsequent exposure of the treated wood under conditions of use. In typical cases the reaction may include atmospheric oxidation, or the loss of a volatile reaction product, or both; and all of these conditions are simply referred to herein as changes induced by exposure to the atmosphere.

As heretofore stated, my invention is not limited to the use of the solutions for wood impregnation purposes. They may be employed for example for all insecticidal or fungicidal purposes, for which they possess certain advantages as compared with the usual aqueous suspensions of toxic compounds. These suspensions deposit toxic compounds over an area which is in general, less than the total area wetted by the liquid by which they are carried. My solutions on the contrary, when spread in the form of thin films upon foliage, undergo a relatively rapid decomposition or chemical change the result of which is to deposit the toxic body, such as cupric arsenite, over an area which is co-extensive with that wetted by the original solution. In other words, the distribution of a given weight of insoluble toxic body over a given area to be protected is more effectively performed with the hereindescribed clear solutions than with such suspensions as are commonly used for insecticidal and fungicidal purposes.

I claim:

1. Method of preserving wood comprising impregnating it with an aqueous solution containing water-soluble components capable of reacting, on exposure to the atmosphere, with progressive increase in basicity, to deposit within the body of the wood a compound of low solubility and high toxicity.

2. Method of preserving wood comprising impregnating it with an aqueous solution containing water-soluble components, including compounds of copper and arsenic, capable of reacting, on exposure to the atmosphere and with progressive increase in basicity, to deposit within the body of the wood a compound of low solubility and high toxicity.

3. Method of preserving wood comprising impregnating it with an aqueous solution containing water-soluble components capable of reacting, on exposure to the atmosphere and with progressive increase in basicity, to deposit within the body of the wood a copper-arsenic compound of low solubility and high toxicity.

4. Method of preserving wood comprising impregnating it with an aqueous solution containing water-soluble components capable of reacting, on exposure to the atmosphere and with progressive increase in basicity, to deposit cupric arsenite within the body of the wood.

5. Method of preserving wood comprising impregnating it with an aqueous solution containing water-soluble components, including a cuprous salt and arsenious acid, capable of reacting, on exposure to the atmosphere, to deposit within the body of the wood a compound of low solubility and high toxicity.

6. Method of preserving wood comprising impregnating it with an aqueous solution containing water-soluble components, including a cuprous salt, arsenious acid and a fluoride, capable of reacting, on exposure to the atmosphere, to deposit within the body of the wood a compound of low solubility and high toxicity.

7. Method of protecting vegetable substances from attack by insects, fungi, etc., comprising applying thereto an aqueous solution containing water-soluble components capable of reacting, on exposure to the atmosphere, with progressive increase in basicity, to deposit thereon a compound of low solubility and high toxicity.

8. An insecticidal and fungicidal solution comprising water-soluble components capable of reacting, on sufficient exposure to the atmosphere, and with progressive increase in basicity, to deposit a toxic body of low solubility, said solution sufficiently stable to permit impregnation of wood therewith.

9. An insecticidal and fungicidal solution comprising water-soluble components, including compounds of copper and arsenic, capable of reacting, on sufficient exposure to the atmosphere and with progressive increase in basicity, to deposit a toxic body of low solubility, said solution sufficiently stable to permit impregnation of wood therewith.

10. An insecticidal and fungicidal solution comprising water-soluble components capable of reacting, on sufficient exposure to the atmosphere and with progressive increase in basicity, to deposit a copper-arsenic compound of low solubility and high toxicity.

11. An insecticidal and fungicidal solution comprising water-soluble components capable of reacting, on sufficient exposure to the atmosphere and with progressive increase in basicity, to deposit cupric arsenite.

12. An insecticidal and fungicidal solution comprising water-soluble components, including a cuprous salt and arsenious acid, capable of reacting, on sufficient exposure to the atmosphere, to deposit a toxic body of low solubility, said solution sufficiently stable to permit impregnation of wood therewith.

13. An insecticidal and fungicidal solution comprising water-soluble components, including a cuprous salt, arsenious acid and a fluoride, capable of reacting, on sufficient exposure to the atmosphere, to deposit a toxic body of low solubility, said solution sufficiently stable to permit impregnation of wood therewith.

In testimony whereof, I affix my signature.

LEO P. CURTIN.